US008998001B2

(12) United States Patent
Roberts

(10) Patent No.: US 8,998,001 B2
(45) Date of Patent: Apr. 7, 2015

(54) APPARATUS AND METHOD FOR REMOVING MATERIALS FROM A MATERIAL COLLECTION CONTAINER

(75) Inventor: R. Lee Roberts, Rose Valley, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 366 days.

(21) Appl. No.: 13/506,780

(22) Filed: May 17, 2012

(65) Prior Publication Data

US 2013/0118618 A1 May 16, 2013

Related U.S. Application Data

(63) Continuation-in-part of application No. 13/373,303, filed on Nov. 10, 2011.

(51) Int. Cl.
| | |
|---|---|
| B01D 21/24 | (2006.01) |
| B01D 21/00 | (2006.01) |
| B01D 21/18 | (2006.01) |
| B01D 21/20 | (2006.01) |
| C02F 1/00 | (2006.01) |

(52) U.S. Cl.
CPC ............ B01D 21/0003 (2013.01); B01D 21/18 (2013.01); B01D 21/0006 (2013.01); B01D 21/20 (2013.01); B01D 21/245 (2013.01); C02F 2001/007 (2013.01)

(58) Field of Classification Search
CPC ........... B01D 21/0003; B01D 21/0006; B01D 21/18; B01D 21/24; B01D 21/245; C02F 2001/007

USPC .......................... 210/800, 803, 513, 523, 527
See application file for complete search history.

(56) References Cited

U.S. PATENT DOCUMENTS

| | | | | |
|---|---|---|---|---|
| 3,669,271 | A * | 6/1972 | McGivern | 210/527 |
| 3,797,664 | A * | 3/1974 | Pentz et al. | 210/803 |
| 3,935,104 | A * | 1/1976 | Russell et al. | 210/527 |
| 4,276,165 | A * | 6/1981 | Chamberlain | 210/527 |
| 5,720,890 | A * | 2/1998 | Caliva | 210/800 |
| 6,497,249 | B1 * | 12/2002 | Swan et al. | 210/527 |
| 7,021,472 | B1 * | 4/2006 | Meurer | 210/523 |
| 7,105,096 | B2 | 9/2006 | Meurer | |
| 7,159,724 | B2 | 1/2007 | Brauch et al. | |
| 7,169,312 | B1 | 1/2007 | Meurer | |
| 7,780,015 | B1 * | 8/2010 | Brauch et al. | 210/527 |
| 7,981,302 | B2 | 7/2011 | Brauch et al. | |
| 8,074,810 | B2 | 12/2011 | Brauch et al. | |
| 2001/0052493 | A1 * | 12/2001 | Bryan et al. | 210/513 |
| 2013/0118616 | A1 * | 5/2013 | Roberts et al. | 137/561 R |

\* cited by examiner

*Primary Examiner* — Christopher Upton
(74) *Attorney, Agent, or Firm* — Merek, Blackmon & Vorheees, LLC

(57) ABSTRACT

A system for removing sludge from a collection area having at least one collection conduit for receiving and collecting sludge. The at least one collection conduit has at least one opening for receiving sludge. The system further includes a sludge collection control member operably associated with at least a portion of the at least one collection conduit for varying at least one sludge collection characteristic of the at least one collection conduit. The sludge collection control member for varying at least one sludge collection characteristic of the at least one collection conduit is preferably configured such that it can be readily added to an existing sludge removal system.

14 Claims, 8 Drawing Sheets

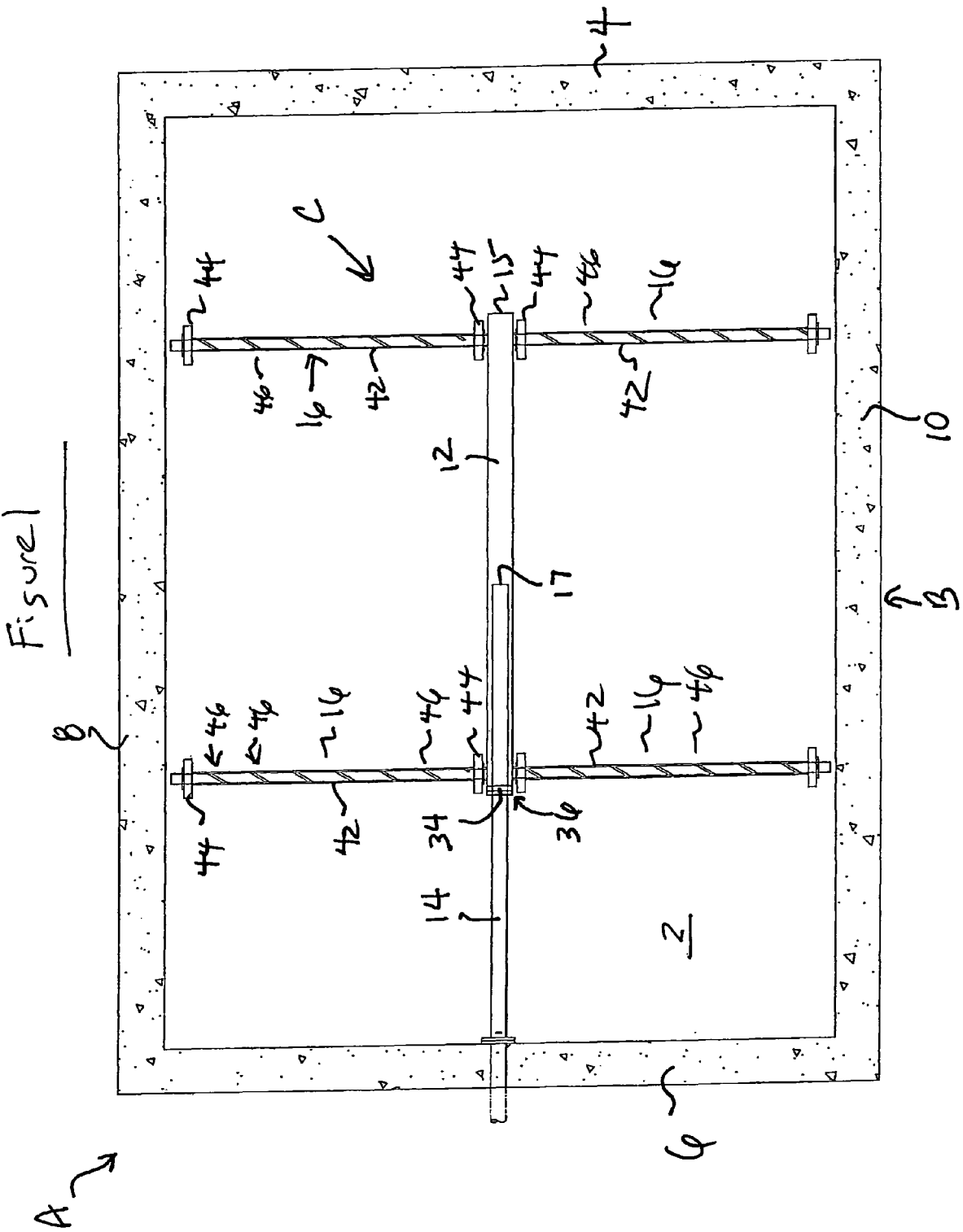

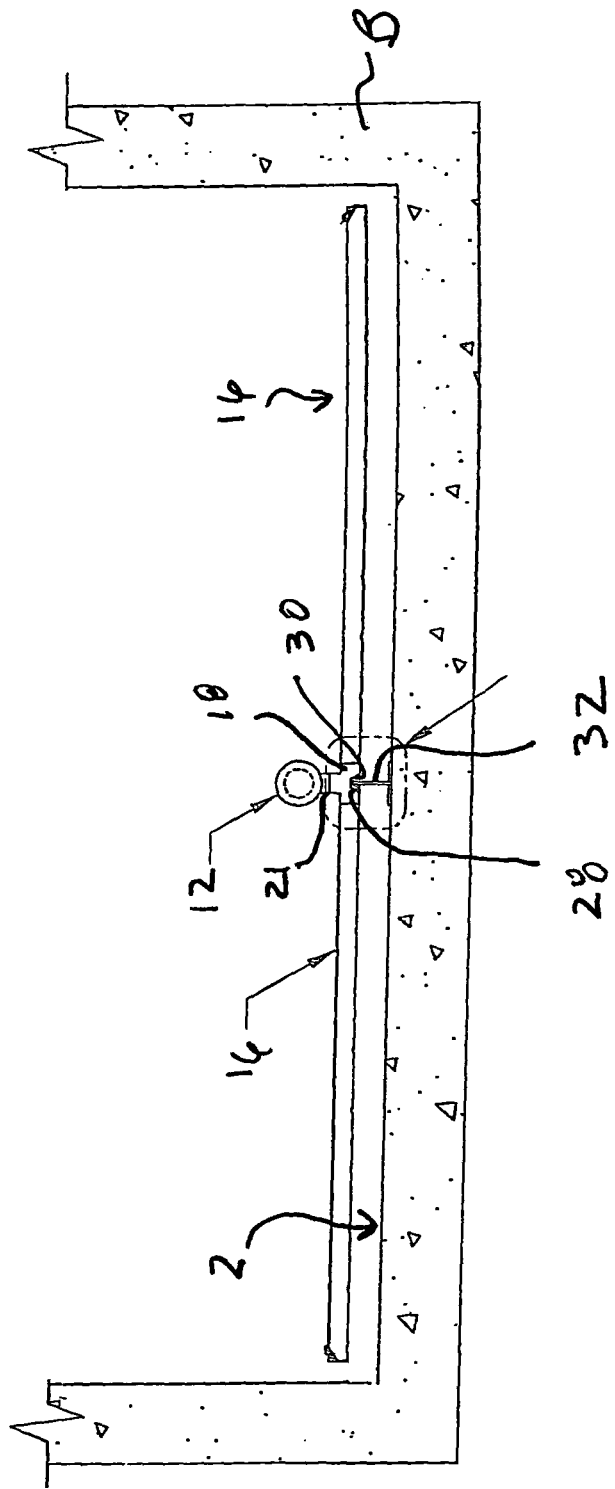

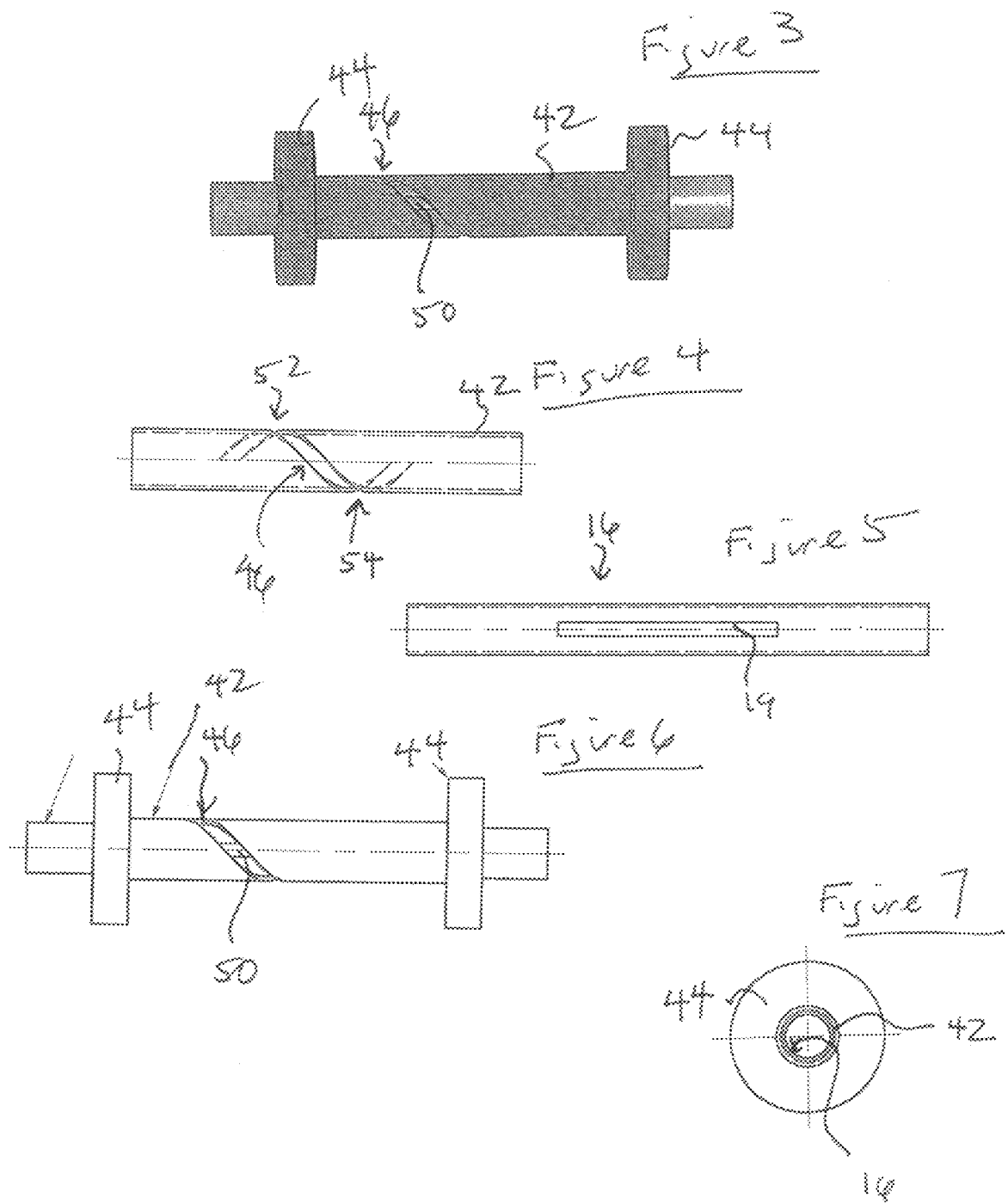

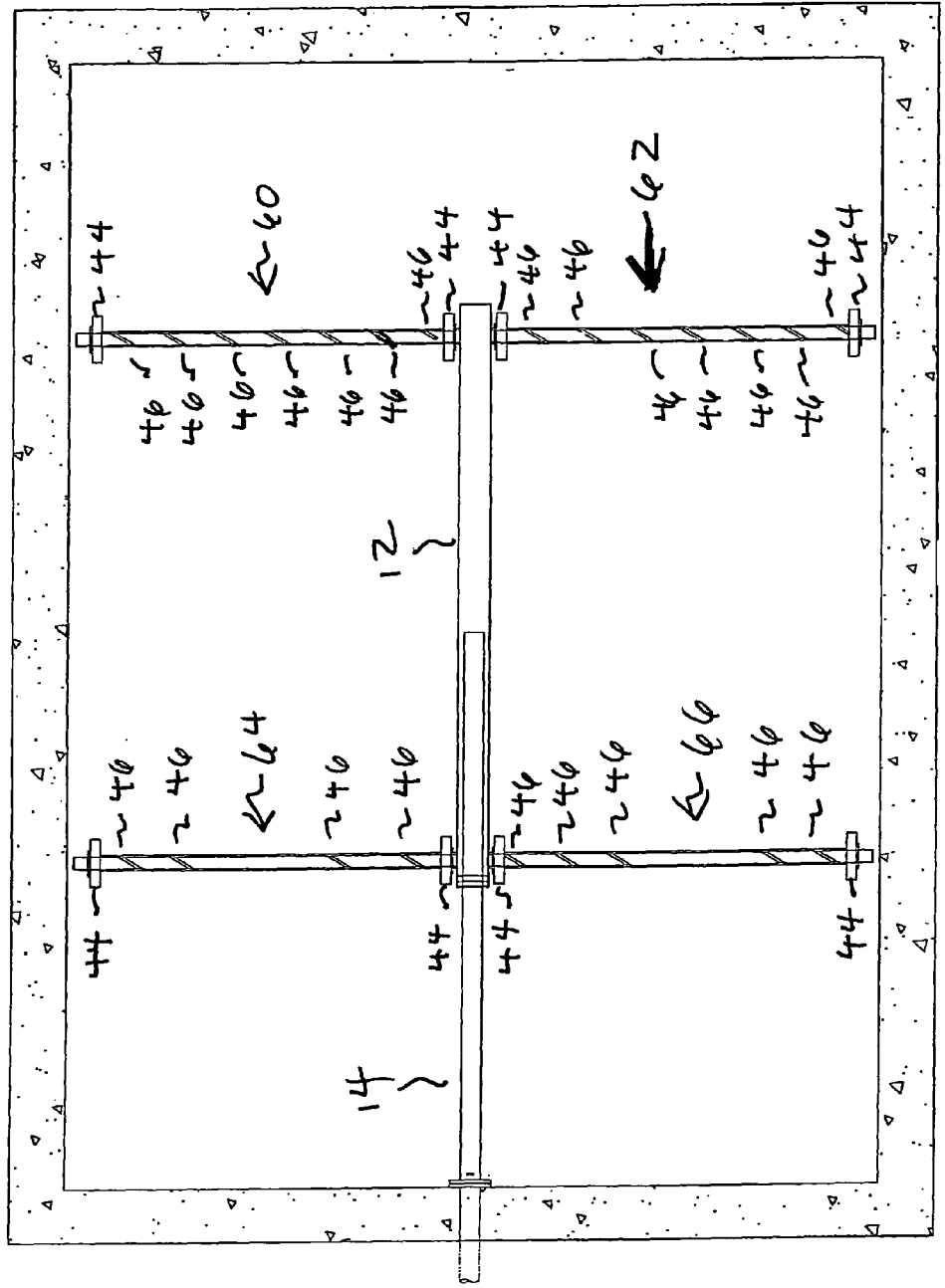

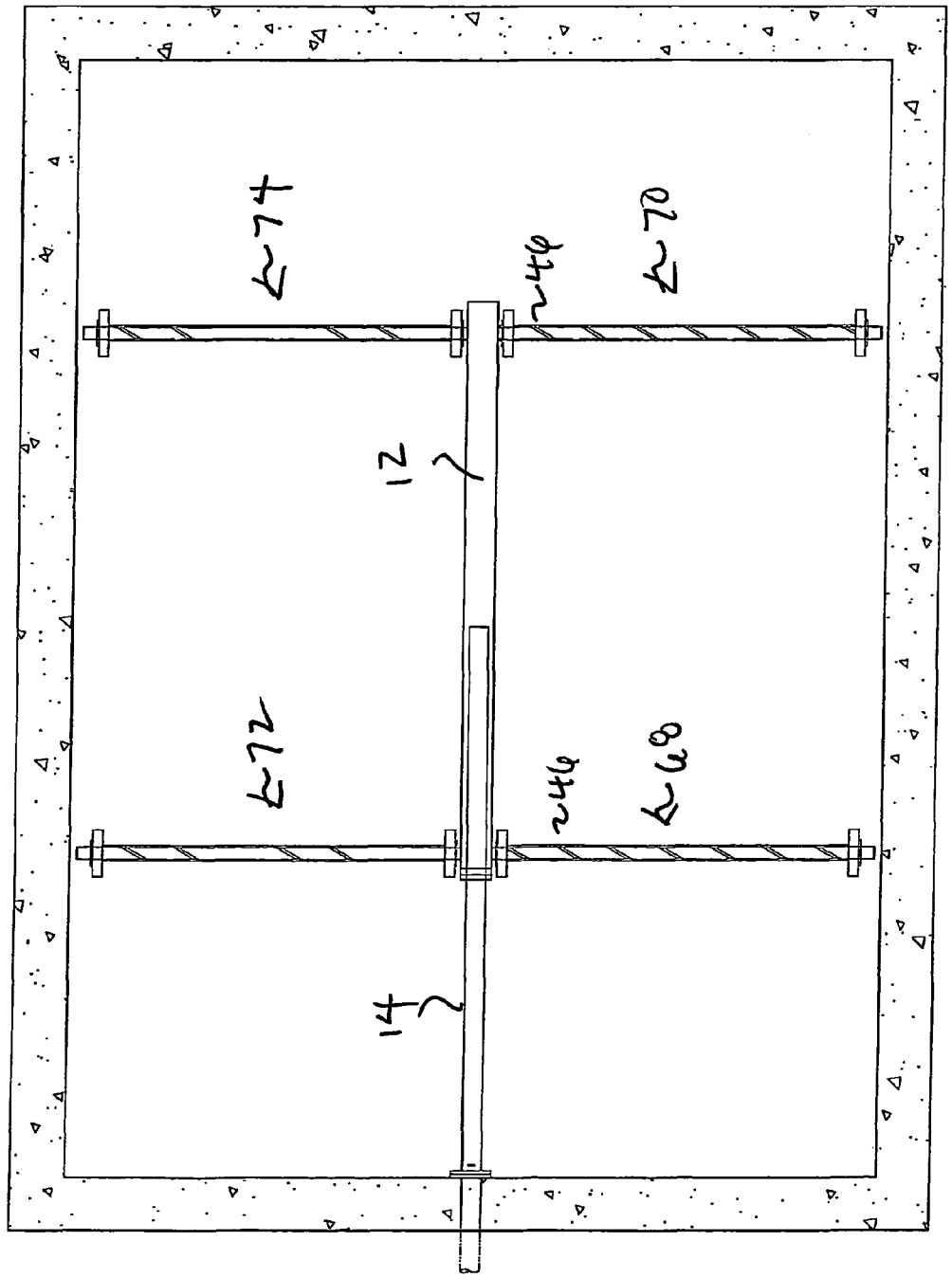

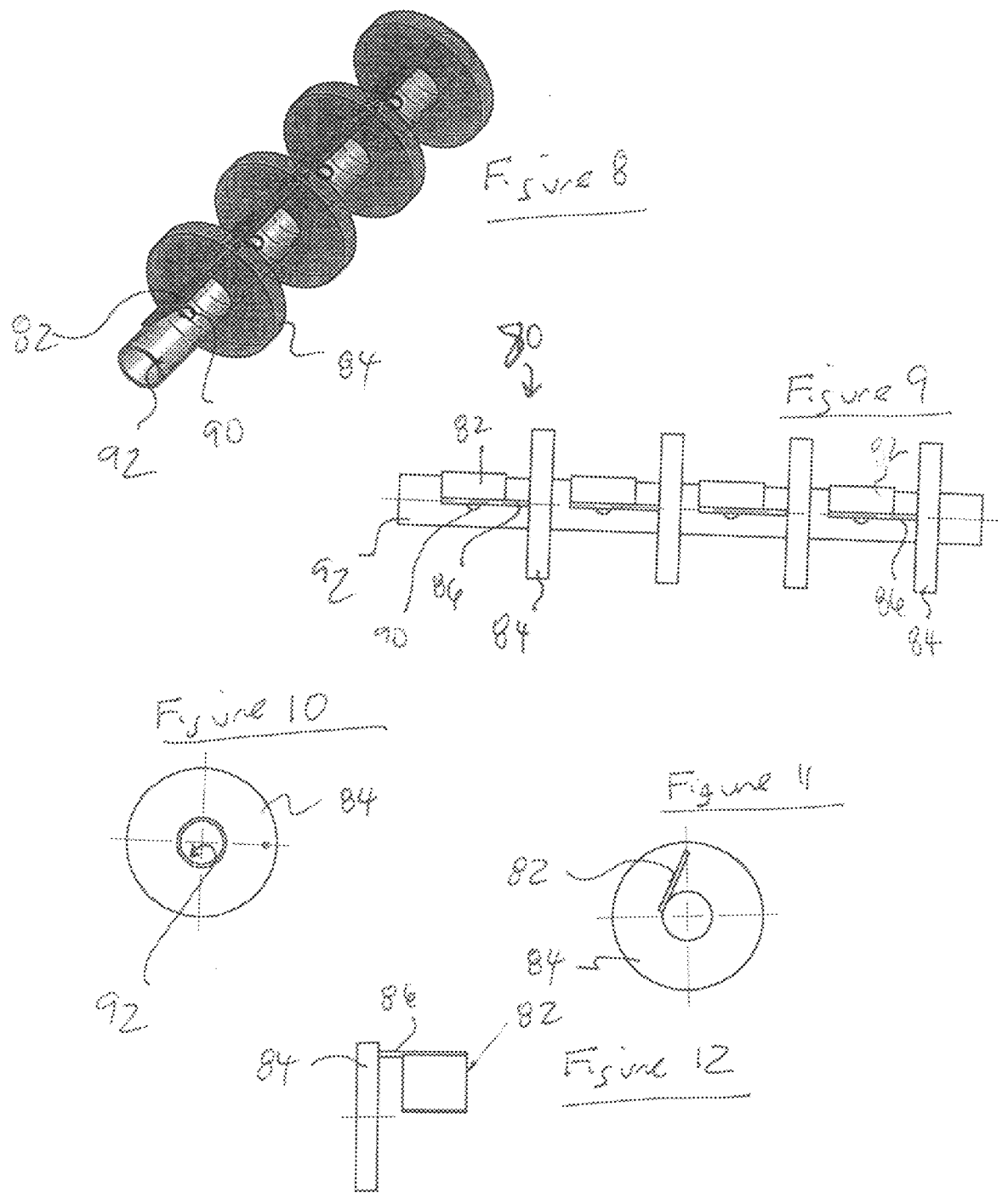

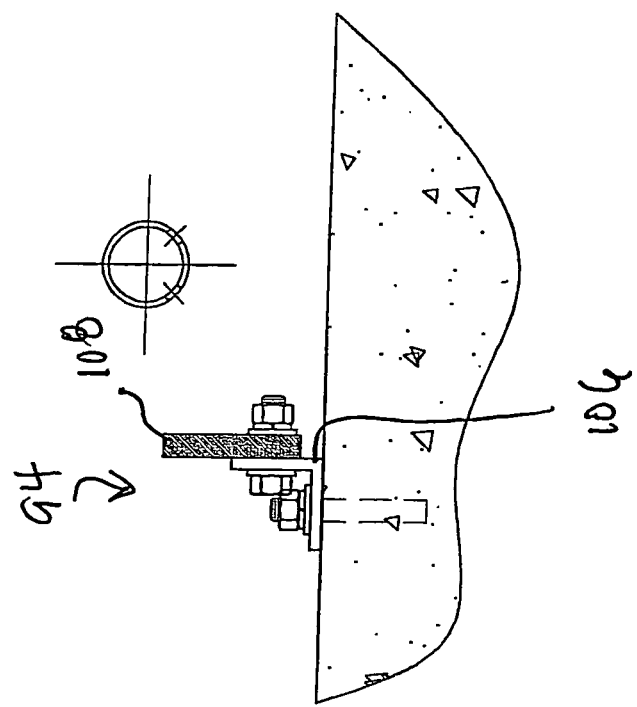

APPARATUS AND METHOD FOR REMOVING MATERIALS FROM A MATERIAL COLLECTION CONTAINER

RELATED APPLICATIONS

The subject patent application is a continuation-in-part of U.S. patent application Ser. No. 13/373,303 filed on Nov. 10, 2011. The entire contents of U.S. patent application Ser. No. 13/373,303 are incorporated herein by reference.

FIELD OF THE INVENTION

The present invention is directed to an apparatus and method for removing material from a material collection container. The material may be any form of impurity including a fluid, a solid or a combination thereof. In the most preferred form, the present invention is directed to an apparatus and method for removing sludge from a sludge collection container. The sludge collection container may include one or more members designed to settle sludge from water or wastewater including but not limited to settling plates or settling tubes. The present invention may be used in containers having other structures that would intentionally or inadvertently cause impurities to collect in the containers and where it is beneficial to remove the collected impurities from the containers.

BACKGROUND OF THE INVENTION

Filter or clarification systems have employed various devices to remove impurities from water and/or wastewater for a number of years. In these types of filter systems, settling systems are often used to remove impurities from a liquid. Plates or tubes are commonly used to drastically reduce the footprint of prior clarification systems that merely included an open basin. The plates or tubes are commonly mounted at fixed angles to the surface of the liquid to form a plurality of liquid flow channels. The fixed angle of the plates or tubes creates overlapping, horizontally projected surfaces that increase the effective settling surface area compared to an open basin. The increased effective settling surface area is desirable as filtering or clarification capacity is proportional to surface area.

The liquid to be filtered is directed through the plurality of liquid flow channels to cause the impurities to settle downwardly at the lower portion of a detention basin or sludge collection area. The liquid to be filtered can travel upwardly or downwardly through the plurality of liquid flow channels during the filtration or clarification process. As the liquid flows upwardly or downwardly through the inclined liquid flow passageways, the impurities settle out of the liquid being filtered and accumulate in the lower portion of the detention basin or collection area. It is desirable to periodically remove the impurities from the collection container.

Sludge removal systems employing a plurality of laterals operably connected to one or more headers to remove sludge from the collection area have a number of disadvantages. For example, the laterals that direct sludge from the collection area to one or more headers in fluid communication with the plurality of laterals have orifices or openings that can become clogged by various particulate in the sludge including leaves and other matter. Prior sludge removal systems simply do not have an effective manner for freeing obstructions around or in the orifices or openings formed in the plurality of laterals. Further, prior sludge removal systems simply do not have means for allowing at least one flow characteristic of the one or more laterals to be varied without altering the structure of the one or more collection laterals.

Hence, there is a need for a material removal system that overcomes the aforementioned disadvantages as well as other disadvantages not articulated above.

OBJECTS AND SUMMARY OF THE INVENTION

An object of the present invention is to provide a novel and unobvious apparatus and method for removing material from a detention basin or collection area.

Another object of a preferred embodiment of the present invention is to provide a material removal system that prevents obstructions from clogging one or more openings or orifices in one or more sludge removal conduits.

A further object of a preferred embodiment of the present invention is to provide a material removal system that is designed to free any obstructions in or around one or more openings or orifices in one or more sludge removal conduits.

Still a further object of a preferred embodiment of the present invention is to provide a material removal system that allows one to readily vary at least one sludge removal characteristic of at least one or more of the sludge removal conduits without altering the structure of the one or more sludge removal conduits.

Yet another object of a preferred embodiment of the present invention is to provide a material removal system that allows one to readily vary the sludge removal in at least one area of the collection container from at least one other area in the collection container.

Still a further object of a preferred embodiment of the present invention is to provide a cost effective material removal system that is relatively easy to install and operate to effectively and efficiently remove material from a material collection container.

Yet still another object of a preferred embodiment of the present invention is to provide a material removal system that allows one to readily vary the sludge removal in at least one area of the collection container from at least one other area in the collection container without altering the structure of the collection laterals or the collection headers.

Yet a further object of a preferred embodiment of the present invention is to provide one or more components that can be installed in an existing material removal system to prevent clogging of one or more sludge removal conduits.

Another object of a preferred embodiment of the present invention is to provide one or more components that can be installed in an existing material removal system to vary at least one sludge removal characteristic of one or more sludge removal conduits.

A further object of a preferred embodiment of the present invention is to provide one or more components that can be installed in an existing material removal system to vary at least one sludge removal characteristic of one or more sludge removal conduits without altering the structure of the one or more sludge removal conduits.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a system for removing sludge from a collection area including at least one collection header and at least one collection lateral operably associated with the at least one collection header such that sludge collected by the at least one collection lateral can pass into the at least one collection header to remove sludge from a collection area. The at least one collection lateral has at least one opening for receiving sludge. The system further included means for varying at least one characteristic relating to sludge collection of the at least one collection lateral. The means for vary at least one characteristic relating to sludge collection of the at least one collection lateral is operably associated with the at least one collection lateral.

In another preferred embodiment, the means for varying at least one characteristic relating to sludge collection of the at least one collection lateral is configured such that it can be readily added to an existing sludge removal system.

Another preferred embodiment of the present invention is directed to a system for removing sludge from a collection area including at least one collection header and at least one collection lateral operably associated with the at least one collection header such that sludge collected by the at least one collection lateral can pass into the at least one collection header to remove sludge from a collection area. The at least one collection lateral has at least one opening for receiving sludge. The system further includes a sludge collection control member mounted about at least a portion of the at least one collection lateral for varying at least one sludge collection characteristic of the at least one collection lateral.

In a further preferred embodiment, the sludge collection control member for varying at least one sludge collection characteristic of the at least one collection lateral is configured such that it can be readily added to an existing sludge removal system.

A still further preferred embodiment of the present invention is directed to a system for removing sludge from a collection area including at least one collection header, a first collection lateral and a second collection lateral. The first collection lateral and the second collection lateral are operably associated with the at least one collection header such that sludge collected by the first collection lateral and the second collection lateral can pass into the at least one collection header to remove sludge from a collection area. The first collection lateral and the second collection lateral are configured to have at least one sludge collection characteristic that is substantially the same. A sludge collection control member is operably associated with the first collection lateral to change the at least one sludge collection characteristic of the first collection lateral so that the at least one sludge collection characteristic of the first collection lateral is no longer substantially the same as the second collection lateral.

In still another preferred embodiment of the present invention, the sludge collection control member referred to in the preceding paragraph is configured such that it can be readily added to an existing sludge removal system.

Another preferred embodiment of the present invention is directed to a system for removing sludge from a collection area including at least one collection conduit for removing sludge accumulating in a collection area. The at least one collection conduit has at least one opening for receiving sludge and at least one passageway operably associated with the at least one opening. The at least one passageway is configured to transport sludge from one location to another location. The system further includes means for varying at least one characteristic relating to sludge collection of the at least one collection conduit. The means for vary at least one characteristic relating to sludge collection of the at least one collection conduit is operably associated with said at least one collection conduit.

In still another preferred embodiment, the means for varying at least one characteristic relating to sludge collection of the at least one collection lateral is configured such that it can be readily added to an existing sludge removal system.

BRIEF DESCRIPTION OF THE DRAWINGS

FIG. 1 is a plan view of a preferred form of the present invention.

FIG. 2 is a cross-sectional view illustrating one of many possible ways the sludge collection laterals can be connected to the sludge collection headers.

FIG. 3 is a perspective view illustrating the preferred relationship between a simplified version of the preferred sludge collection control member and a simplified version of the preferred sludge collection lateral illustrated in FIG. 1.

FIG. 4 is a front view of a simplified version of the preferred sleeve of the preferred sludge collection control member illustrated in FIG. 1.

FIG. 5 is a front view of a simplified version of the preferred sludge collection lateral illustrated in FIG. 1.

FIG. 6 is a front view illustrating the preferred relationship between a simplified version of the preferred sludge collection control member and a simplified version of the preferred sludge collection lateral illustrated in FIG. 1.

FIG. 7 is an end view of the structure illustrated in FIGS. 3 and 6.

FIG. 7A is a plan view of another preferred form of the present invention illustrating how one can vary the amount of sludge collected from different locations in the collection container by varying the number of spiral slots on the sludge collection control member of one or more collection laterals.

FIG. 7B is a plan view of a further preferred form of the present invention illustrating another example of how one can vary the amount of sludge collected from different locations in the collection container by varying the number of spiral slots on the sludge collection control member of one or more collection laterals.

FIG. 8 is a perspective view illustrating the preferred relationship between one alternative sludge collection control member and an alternative sludge collection lateral.

FIG. 9 is a plan view illustrating the preferred relationship between one alternative sludge collection control member and an alternative sludge collection lateral.

FIG. 10 is a right end view of the structures illustrated in FIGS. 8 and 9.

FIG. 11 is a left end view of the structures illustrated in FIGS. 8 and 9.

FIG. 12 is a view illustrating the preferred relationship between a preferred cleaning element, a preferred support member and a preferred roller/wheel.

FIG. 14 is a cross-sectional view taken along lines A-A in FIG. 13.

DETAILED DESCRIPTION OF THE PREFERRED EMBODIMENTS OF THE INVENTION

Figure 13:
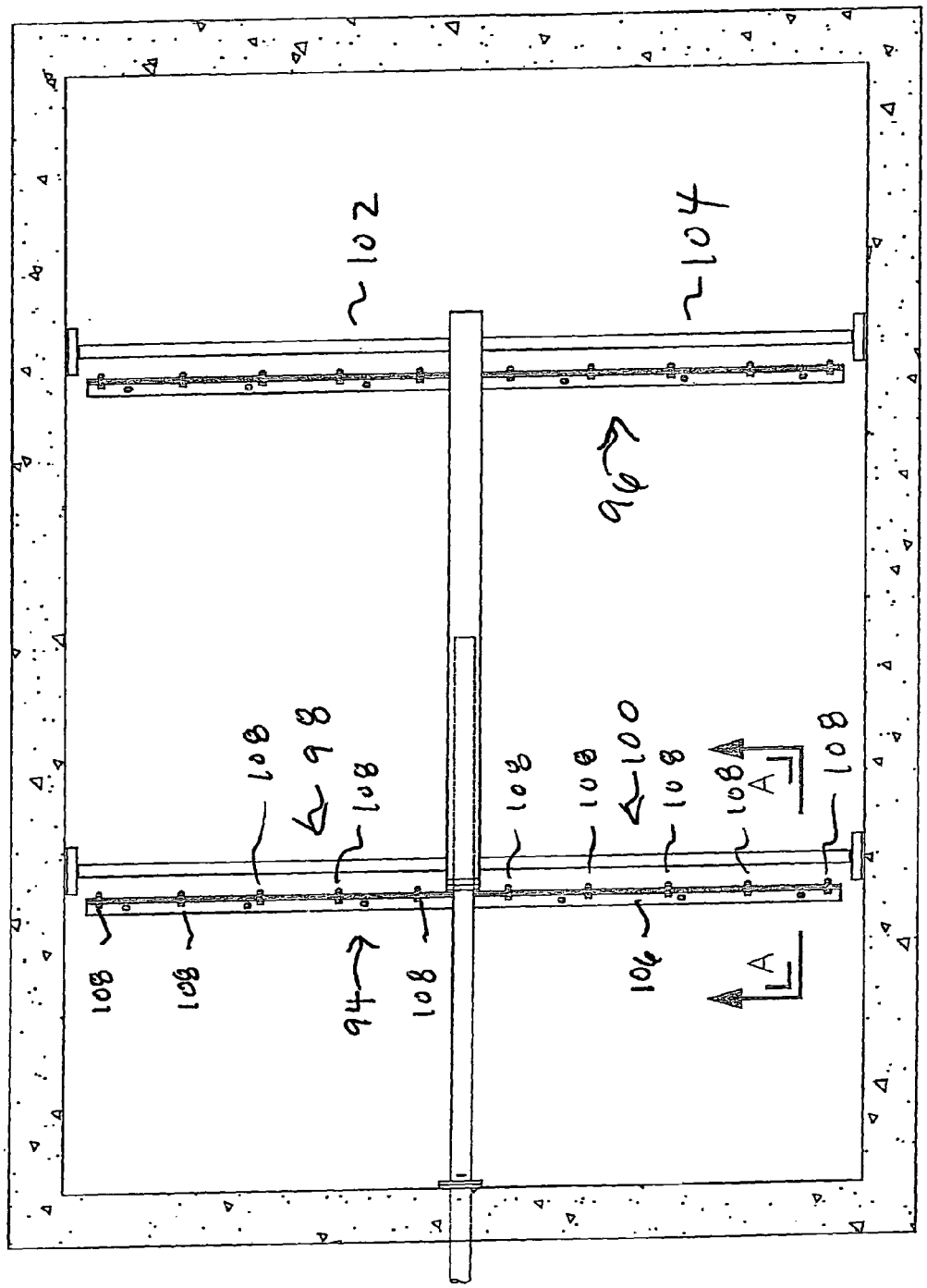
FIG. 13 is a plan view of a further preferred form of the present invention.

The preferred forms of the invention will now be described with reference to FIGS. 1-14. The appended claims are not limited to the preferred forms and no term and/or phrase used herein is to be given a meaning other than its ordinary meaning unless it is expressly stated otherwise.

FIGS. 1 Through 7

Referring to FIG. 1, a settling system A employing a preferred form of the invention is illustrated in one of many possible configurations. In the most preferred form, the material being removed from the settling system A is sludge. Settling system A includes a material container B. The material container may include one or more settling assemblies (not shown) having a plurality of inclined passageways in which an influent to be filtered or clarified is passed. The plurality of inclined passageways may be formed for example by a plurality of plates or tubes. As the influent passes through the inclined passageways of the one or more settling assemblies impurities in the influent settle and collect on the floor 2 of the material collection container B.

Material removal system C periodically removes the impurities from material container B. It should be noted that the present invention is not limited to use in settling systems but rather can be used in any system in which it is desirable to remove material collecting in a container or basin. In FIGS. 1 and 2, the material collection container B is shown as being formed from concrete and having a rectangular configuration with end walls 4 and 6 and side walls 8 and 10. However, it will be readily appreciated that material collection container B may be formed from any suitable material and may take any desired configuration.

As shown in FIG. 1, material removal system C includes first and second conduits or headers 12 and 14. Preferably, conduits 12 and 14 are substantially cylindrical and formed from a rigid or semi-rigid material (e.g., PVC, stainless steel or other suitable material). Conduits 12 and 14 have a telescoping relationship such that conduit 12 is movable between a fully extended position in which end 15 of conduit 12 is disposed adjacent wall 4 and a fully retracted position in which end 15 is adjacent open end 17 of conduit 14. Conduit 12 is in communication with conduit 14 such that material in conduit 12 can pass into conduit 14.

Conduit 14 is fixed relative to material collection container B. Any suitable drive system may be used for extending and retracting conduit 12 including but not limited to the cable drive system disclosed in U.S. Pat. No. 6,951,620. The drive system can be mechanical, pneumatic, hydraulic or any combination thereof. It should be noted that the present invention is not limited to use with sludge removal systems in which one or more conduits are movable. Rather, the present invention can be used in any suitable sludge removal system including but not limited to fixed grid sludge removal systems. One such fixed grid system is the SPYDER® sludge removal system.

In the embodiment disclosed in FIG. 1, four material collection laterals 16 are connected to conduit 12 in the manner described below. However, the number of collection laterals may be varied as desired. As seen in FIG. 5, each of the material collection laterals 16 includes at least one elongated slot 19 for receiving material collected in container B. While FIG. 5 only illustrates one slot 19, each lateral will typically include a plurality of uniformly spaced slots 19 over the length of the lateral. Preferably, each slot 19 extends along the longitudinal axis of the corresponding collection lateral 16.

Referring to FIG. 2, collection laterals 16 are connected to conduit or header 12 so that laterals 16 move with conduit or header 12. The manner of connecting each of the collection laterals 16 to the underside of conduit 12 is preferably the same. Specifically, a T-shaped coupler 18 is connected to a hollow collar 21 extending downwardly from the underside of header 12. Preferably, the connection of conduit 12 to collar 21 and the connection of collar 21 to T-shaped coupler 18 is fluid tight and may be achieved in any known manner. A material collection conduit 16 is connected preferably in a fluid tight manner to each of ends 24 and 26 of T-shaped coupler 18. The plurality of slots 19 uniformly spaced along the length of the respective lateral are preferably disposed directly adjacent floor 2 of container B to receive material collected in container B. It should be noted that collar 21 may be omitted by directly connecting T-shaped coupler 18 to the underside of conduit 12. Moreover, many other arrangements may be used to connect laterals 16 to conduit 12. For example, laterals 16 may be directly connected to header 12.

Referring to FIG. 2, T-shaped coupler 18 has a notch or recess 28 that extends the entire length of the underside of T-shaped coupler 18. The notch or recess preferably forms two interior, inclined, planar surfaces as means for facilitating movement of material collected by conduits 16 upwardly into conduit 12 and out of container B through header 14. A friction reduction member 30 is disposed in notch or recess 28 and includes a slot or other opening for receiving an upper portion of center support rail 32. The friction reduction member 30 is formed from a polymeric material and is fixed to T-shaped coupler 18 so that the friction reduction member 30 cannot move relative to T-shaped coupler 18 or conduit 12. As the conduit 12 moves between the fully extended position and the fully retracted position, the friction reduction member 30 facilitates that movement by reducing the friction between center rail 32 and both T-shaped couplers 18 associated with each of the two pairs of collection laterals 16.

Preferably, center rail 32 is bolted or otherwise secured to the floor 2 of container B. However, it will be readily appreciated that center rail 32 may be fixed in place by securing it to other portions of container B. Further, rail 32 and member 30 may be completely omitted.

Referring to FIG. 1, a seal 34 is positioned in end 36 of conduit 12. Seal 34 surrounds conduit 14 and is movable along conduit 14 as conduit 12 travels between the fully extended position and the fully retracted position.

Referring to FIGS. 1 and 3 through 7, the preferred sludge collection control member that may be associated with one or more of sludge collection laterals 16 will now be described.

Referring to FIG. 1, a sludge collection control member 40 may be mounted about each collection lateral 16. However, it should be noted that the sludge collection control member 40 may be omitted from some of the laterals to vary the amount of sludge removal from one location in container B versus another location in container B. Preferably, the sludge collection control member 40 includes a tubular sleeve 42 connected to a pair of wheels or rollers 44. The tubular sleeve 42 preferably includes one or more spiral slots 46. In the embodiment depicted in FIG. 1, there are a plurality of spiral slots 46, one for each elongated slot formed in the corresponding lateral. Tubular sleeves 42 are free to rotate independent or relative to the corresponding sludge collection laterals 16. Spiral slots 46 are preferably located adjacent elongated slots 19 formed in the collection laterals 16. As the header 12 moves between the fully extended, position and the fully retracted position, the pair of wheels 44 causes the sleeve of the corresponding sludge collection control member 40 to rotate relative to the corresponding sludge collection lateral 16. This in turn will cause spiral slot 46 to move relative to slot 19 resulting in different portions of slot 19 becoming free to receive sludge while other portions of slot 19 are blocked by solid portions of sleeve 42. Referring to FIG. 6, portion 50 of slot 19 is free to receive sludge from the collection area while other portions of slot 19 remain blocked.

The relative movement of sleeve 42 and lateral 16 prevents slot 19 from becoming clogged or otherwise unable to receive sludge. Further, the movement of the spiral slot 46 relative to elongated slot 19 varies the sludge collection characteristics of slot 19 without in any way altering the structure of lateral 16, i.e., lateral 16 remains unchanged. Specifically, as sleeve 42 rotates clockwise relative to lateral 16 as seen in FIG. 6, portions of slot 19 to the left of portion 50 will become open or free to collect sludge. Similarly, as sleeve 42 rotates counterclockwise relative to lateral 16 as seen in FIG. 6, portions of slot 19 to the right of portion 50 will become open or free to collect sludge. In this manner, one can readily vary the rate at which sludge can pass through slot 19 as well as vary the point from which sludge is collected.

By varying the longitudinal distance between peak 52 and valley 54 of spiral slot 46 (see FIG. 4), one can further vary the sludge collection characteristics of slots 19 in the sludge collection laterals 16. It should be noted that shapes other than a spiral slot may be used to vary the sludge collection characteristics of slots 19. For example, slot 46 could have the same configuration as slot 19 but just be smaller than slot 19 to vary the sludge collection characteristics. Hence, the present invention is not limited to a particular shape or size. Rather, any size or shape may be used where at least a portion of a slot or other opening in a lateral is closed upon relative motion between the control member and the corresponding lateral 16. It should also be noted that spiral slot 46 may be formed in laterals 16 and slot 19 formed in sleeves 42. It should be further noted that wheels 44 may be omitted. In this instance, the contact between sleeve 42 and the floor 2 as conduit 12 moves between the fully extended and fully retracted position will cause the relative rotation between sleeve 42 and the corresponding lateral 16. Each spiral slot 46 is spaced from an adjacent spiral slot, i.e., a solid cylindrical portion of sleeve is formed between adjacent slots 46.

It should be further noted that the present invention is not limited to applications having a header that moves. Rather, where the header and laterals are fixed, the relative rotation between sleeve 42 and lateral 16 may be achieved by any suitable driving force. Further, the present invention can be used in applications where there is only one conduit for collecting and removing sludge from a collection area. For example, in a cylindrical collection basin having a single collection conduit that pivots or rotates to remove sludge from the cylindrical collection basin, a sludge collection control member similar to member 40 can be operably associated with the single collection conduit.

Referring to FIG. 7A, the number of spiral slots formed in a given sleeve may vary from lateral to lateral to vary the amount of sludge collected from one location in container B versus another location in container B. Aligned laterals 60 and 62, have the same number of spiral slots 46. Laterals 64 and 66 have a fewer number of spiral slots than laterals 60 and 62 so that more sludge is likely to be collected from the areas adjacent laterals 60 and 62 than the amount of sludge collected from the areas adjacent laterals 64 and 66. The laterals 60, 62, 64 and 66 have the same number slots 19 with each slot 19 having the same size and shape. Yet, by employing the present invention, one can readily vary the collection capacity of each of the laterals 16 without altering the structure of any of laterals 60, 62, 64 and 66. Hence, the present invention can be used to retrofit existing sludge removal systems. FIG. 7B illustrates the same concept as illustrated in FIG. 7A. Specifically, laterals 68 and 70 positioned on the same side of header 12 have the same number of identical spiral slots 46. Lateral 72 and 74 have fewer spiral slots than laterals 68 and 70. While laterals 72 and 74 have the same number of spiral slots the positioning of the slots differ to again vary the amount of sludge collected from one location from the amount of sludge collected from another location. It should be further noted that sleeve 42 may be omitted from one or more but not all of the laterals to vary the amount of sludge collected from different areas in container B.

It should be further appreciated that due to the design of the preferred sludge collection control member 40, control member 40 may be readily added to pre-existing sludge removal systems to vary at least one sludge removal characteristic of the pre-existing sludge removal system.

FIGS. 8 to 12

Referring to FIGS. 8 to 12, another preferred form of sludge collection control member will now be described. Sludge collection control member 80 includes a cleaning element 82 supported on a wheel 84 by a support rod 86 adjacent each opening 90 in lateral 92. Laterals 92 can be connected to header 12 in a manner similar to that described in connection with laterals 16. Preferably, the cleaning element 82 is a flexible brush type structure or similar element. However, it should be understood that the cleaning element may be a semi-rigid or rigid plate.

As conduit 12 travels between the fully retracted position and the fully extended position, wheels 84 will roll causing the corresponding cleaning element 82 to rotate about the corresponding lateral adjacent the corresponding opening 90 freeing any obstruction around or in the corresponding opening 90 to return the opening 90 to its full collection capacity. In this manner, cleaning element 82 is able to vary at least one sludge collection characteristic lateral, i.e., the collection capacity of the opening from a clogged state to an unclogged state.

FIGS. 13 and 14

Referring to FIGS. 13 and 14, another preferred form of sludge collection control member will now be described. In this embodiment, a pair of sludge collection control members 94 and 96 are fixed to the floor of the collection container. As readily seen in FIG. 13, control member 94 is spaced from control member 96 so that control member 94 acts on laterals 98 and 100 each having a plurality of uniformly spaced openings (not shown) and control member 96 acts on laterals 102 and 104 each having a plurality of uniformly spaced openings (not shown). In this preferred embodiment, control members 94 and 96 are identical and, therefore, only one will be described in detail. Control member 94 includes an L-shaped bracket 106 fixed to the floor of the collection container. A plurality of cleaning elements 108 are fixed to bracket 106. Cleaning elements 108 are positioned such that they are aligned with each of the openings in laterals 98 and 100.

As header 12 moves between the fully extended and fully retracted positions, laterals 98 and 100 will move across support member 94 while laterals 102 and 104 move across control member 96. As the laterals move across the corresponding control member, the cleaning elements 108 aligned with each of the openings formed in the laterals will remove any obstructions clogging any of the openings.

While two control members are shown in this embodiment, one or more than two control members may be used as desired. Further, while an L-shaped bracket is used to fix each of the cleaning elements of a control member to the floor, any suitable mounting arrangement may be used. Further, the cleaning elements could have individual mounting arrangement as opposed to a single mounting bracket. Preferably, the cleaning element is a brush type member although any suitable implement may be used to remove obstructions from around and in the openings in the laterals.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A system for removing sludge from a collection area, said system comprising:
   (a) at least one collection header and at least one collection lateral operably associated with said at least one collection header such that sludge collected by said at least one collection lateral can pass into said at least one collection header to remove sludge from a collection area, said at least one collection lateral having at least one opening for receiving sludge;
   (b) means for varying at least one characteristic relating to sludge collection of said at least one collection lateral, said means for vary at least one characteristic relating to sludge collection of said at least one collection lateral being operably associated with said at least one collection lateral, said means for varying at least one characteristic relating to sludge collection of said at least one collection lateral including at least one member, said at least one collection lateral being movable relative to said at least one member, said at least one member being a cleaning member for freeing an obstruction lodged in or around said at least one opening in said at least one collection lateral.

2. A system as set forth in claim 1, wherein:
   (a) said at least one cleaning member is adapted to be fixed to a surface of the collection area; and,
   (b) said at least one collection lateral is configured to move relative to the surface of the collection area.

3. A system as set forth in claim 1, wherein:
   (a) said at least one member is a sleeve mounted about at least a portion of said at least one collection lateral.

4. A system as set forth in claim 3, wherein:
   (a) said at least one collection lateral includes at least one slot extending along a longitudinal axis of said at least one collection lateral: and,
   (b) said sleeve includes at least one spiral slot operably associated with said at least one slot in said at least one collection lateral such that as said sleeve is moved relative to said at least one collection lateral different portions of said slot in said at least one collection lateral are open to collect sludge and different portions of said slot in said at least one collection lateral are closed off.

5. A system for removing sludge from a collection area, said system comprising:
   (a) at least one collection header and at least one collection lateral operably associated with said at least one collection header such that sludge collected by said at least one collection lateral can pass into said at least one collection header to remove sludge from a collection area, said at least one collection lateral having at least one opening for receiving sludge;
   (b) means for varying at least one characteristic relating to sludge collection of said at least one collection lateral, said means for vary at least one characteristic relating to sludge collection of said at least one collection lateral being operably associated with said at least one collection lateral, said means for varying at least one characteristic relating to sludge collection of said at least one collection lateral including at least one member, said at least one collection lateral being movable relative to said at least one member, said at least one collection lateral having a plurality of openings for receiving sludge; and
   (c) said at least one member is a cleaning unit configured to free obstructions lodged in or around said plurality of openings in said collection lateral.

6. A system as set forth in claim 5, wherein:
   (a) said cleaning unit includes a plurality of cleaning elements, one of the plurality of cleaning elements is disposed adjacent each of the plurality of openings to free obstructions lodged in or around a corresponding opening.

7. A system as set forth in claim 6, further including:
   (a) a collection container; and,
   (b) said cleaning unit is mounted on a floor of said collection container.

8. A system for removing sludge from a collection area, said system comprising:
   (a) at least one collection header and at least one collection lateral operably associated with said at least one collection header such that sludge collected by said at least one collection lateral can pass into said at least one collection header to remove sludge from a collection area, said at least one collection lateral having at least one opening for receiving sludge; and,
   (b) a sludge collection control member positioned adjacent at least a portion of said at least one collection lateral for varying at least one sludge collection characteristic of said at least one collection lateral, said sludge collection control member being a cleaning unit fixed to a portion of a collection container.

9. A system as set forth in claim 8, wherein:
   (a) said sludge collection control member is configured to move relative to said at least one collection lateral.

10. A system as set forth in claim 8, wherein:
    (a) said cleaning unit includes a support bracket and a plurality of cleaning elements connected to said support bracket.

11. A system as set forth in claim 10, wherein:
    (a) said support bracket is fixed to a floor of the collection container.

12. A system as set forth in claim 10, wherein:
    (a) the at least one collection lateral includes a plurality of openings for receiving sludge, each of the plurality of cleaning elements is aligned with one of the plurality of openings.

13. A system for removing sludge from a collection area, said system comprising:
    (a) at least one collection conduit for removing sludge accumulating in a collection area, said at least one collection conduit having at least one opening for receiving sludge and at least one passageway operably associated with said at least one opening, said at least one passageway being configured to transport sludge from one location to another location; and,
    (b) means for varying at least one characteristic relating to sludge collection of said at least one collection conduit, said means for vary at least one characteristic relating to sludge collection of said at least one collection conduit being operably associated with said at least one collection conduit, said means for varying at least one characteristic relating to sludge collection of said at least one collection conduit including at least one member configured to move relative to said at least one collection conduit, said at least one member is connected to a portion of the collection container and the at least one collection conduit is configured to move in the collection container to cause relative motion between the at least one member and the at least one collection lateral.

14. A system as set forth in claim 13, wherein:
(a) at least a portion of said at least one member being disposed adjacent said at least one opening in said at least one collection conduit.

\* \* \* \* \*